(12) United States Patent
Kashmerick et al.

(10) Patent No.: US 6,209,883 B1
(45) Date of Patent: Apr. 3, 2001

(54) SINGLE LAYER HEAD GASKET WITH INTEGRAL STOPPER AND METHOD OF MAKING THE SAME

(75) Inventors: Gerald Emil Kashmerick, Lisle; Thomas P. Plunkett, Bolingbrook, both of IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/249,013

(22) Filed: Feb. 12, 1999

Related U.S. Application Data

(63) Continuation-in-part of application No. 09/034,784, filed on Mar. 4, 1998, now Pat. No. 6,092,810.

(51) Int. Cl.[7] .................................................. F02F 11/00
(52) U.S. Cl. .......................... 277/593; 277/595; 277/598; 29/888.3; 29/DIG. 3
(58) Field of Search ................................. 277/593, 594, 277/595, 598; 29/888.01, 888.3, 34 R, DIG. 3

(56) References Cited

U.S. PATENT DOCUMENTS

| 3,053,544 | 9/1962 | Gorsica . | |
|---|---|---|---|
| 3,580,041 | * 5/1971 | Tilly et al. | 72/336 |
| 3,703,255 | * 11/1972 | Wade | 229/1.5 B |
| 3,846,526 | * 11/1974 | Wade | 264/46.8 A |
| 4,799,695 | 1/1989 | Yoshino . | |
| 4,836,562 | 6/1989 | Yoshino . | |
| 4,964,293 | 10/1990 | Inoue et al. . | |
| 5,076,592 | 12/1991 | Pearlstein . | |
| 5,092,613 | 3/1992 | Udagawa . | |
| 5,205,566 | 4/1993 | Ueta et al. . | |
| 5,209,504 | 5/1993 | Udagawa et al. . | |
| 5,213,345 | 5/1993 | Udagawa . | |
| 5,240,261 | 8/1993 | Udagawa et al. . | |
| 5,294,135 | 3/1994 | Kubouchi et al. . | |
| 5,310,196 | 5/1994 | Kawaguchi et al. . | |
| 5,522,604 | 6/1996 | Weiss et al. . | |
| 5,695,200 | 12/1997 | Diez et al. . | |
| B1 4,799,695 | 10/1991 | Yoshino . | |

* cited by examiner

Primary Examiner—Anthony Knight
Assistant Examiner—Alison K. Pickard
(74) Attorney, Agent, or Firm—Rader, Fishman & Grauer PLLC

(57) ABSTRACT

A gasket for use in an internal combustion engine is disclosed which includes a sealing element formed by an extrusion and ironing process in combination with a folding operation. The gasket has a plate that includes a body portion, a flange portion and an aperture. The thickness of the flange portion is reduced to less than that of the body portion by the extrusion and ironing process. The flange portion is then folded back onto a surface of the plate in facing relation to form a stopper seal to act as a primary seal. Optional embossments may then be formed radially and outwardly of the stopper seal so as to form a secondary seal.

21 Claims, 4 Drawing Sheets

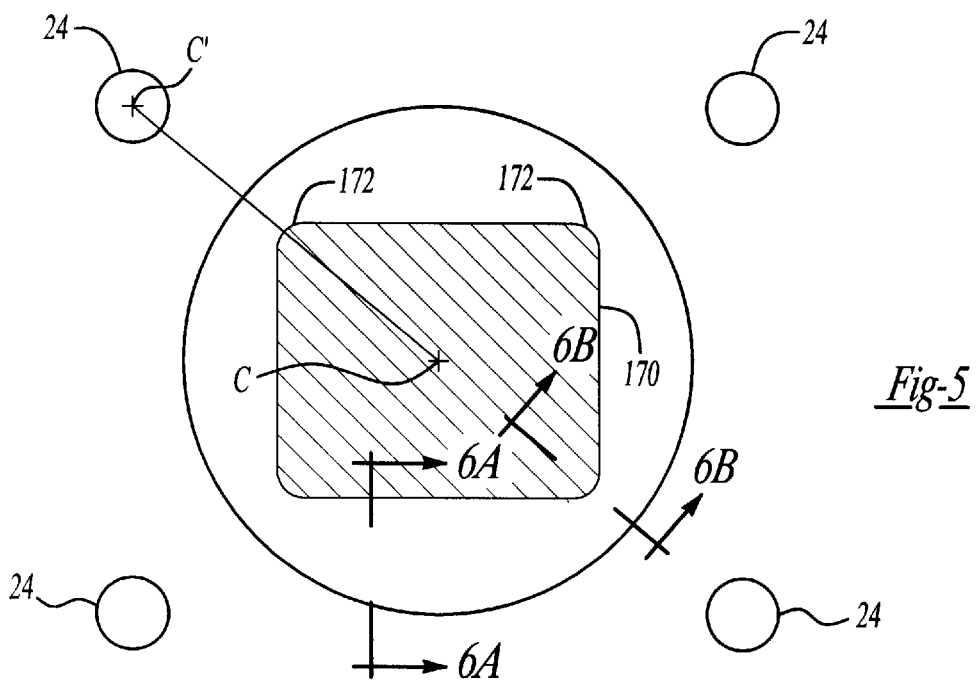
*Fig-5*
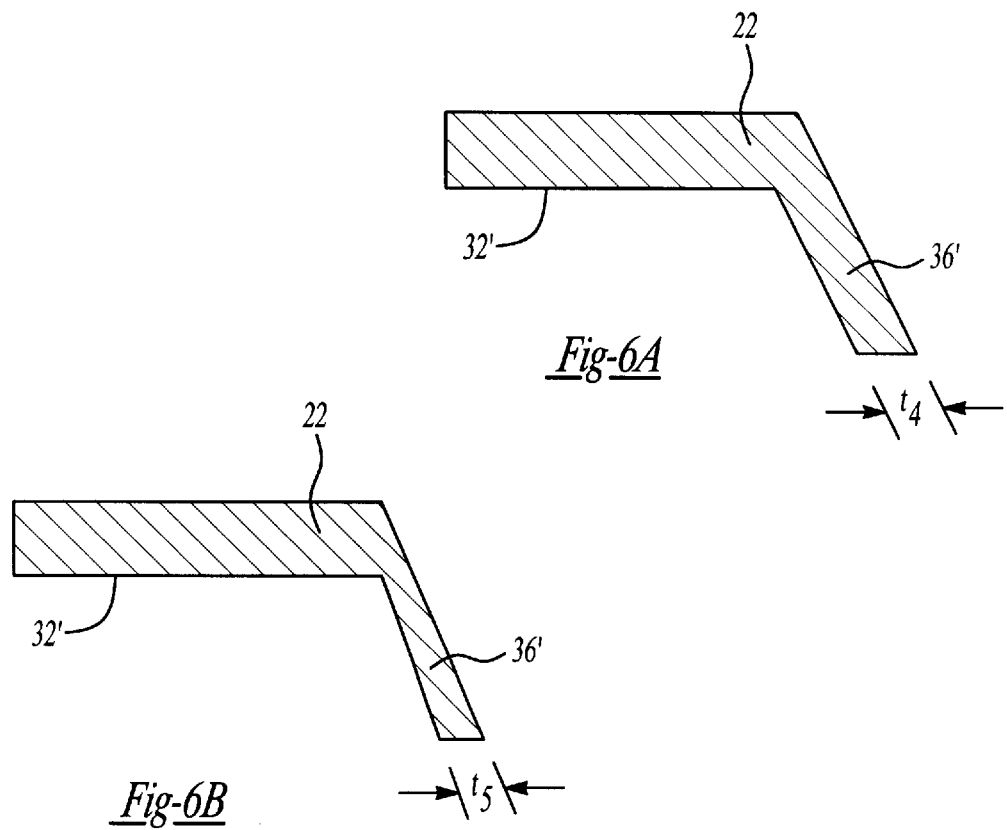
*Fig-6A*
*Fig-6B*

SINGLE LAYER HEAD GASKET WITH INTEGRAL STOPPER AND METHOD OF MAKING THE SAME

This Application is a Continuation-In-Part of application Ser. No. 09/034,784, filed on Mar. 4, 1998, now U.S. Pat. No. 6,092,810 granted on Jul. 25, 2000.

FIELD OF THE INVENTION

The present invention relates to a gasket and more particularly to a metal cylinder head gasket used to seal the joint surfaces of a cylinder head and a cylinder block of an engine whereby the gasket has a primary stopper seal that is formed by an extrusion process in combination with a folding operation.

BACKGROUND OF THE INVENTION

It is known to provide metallic gaskets for sealing opposed joint surfaces of a cylinder head and a cylinder block of an engine. Typical gaskets are provided with apertures which cooperate with the combustion chambers, water passages and oil passages in the engine. The apertures are further provided with some kind of sealing element.

Known sealing elements have included a separate sealing layer for the gasket, a welded on shim, or a thermal spray deposit applied to the outer surface of the gasket. Sealing elements of these types involve more materials, more assembly time, and therefore disadvantageously increase production costs.

Other known metallic gaskets include a metal plate having a substantially uniform thickness that has a portion near the apertures folded over onto the metal plate to create an increased thickness sealing surface. Such sealing elements often exhibit performance problems as the fold areas are prone to cracking due to the thickness of the metal plate.

To overcome such problems, one known gasket includes a metal plate that is provided with stepped portions such that the thickness of the plate is varied. The metal plate is folded at the portion of the plate that has a reduced cross-sectional thickness than the remainder of the plate. However, providing the stepped portions on the plate involves an extra machining step, as well as a specialized tooling set up to achieve precise tolerances, thereby serving to drive production costs upward.

Other known gaskets that have folded sealing elements utilize a metal plate with a substantially uniform thickness, but which further includes the addition of annular grooves in a surface of the metal plate. The grooves are positioned at the fold line and at that part at which the free ends of the folded portions are positioned such that the folded free ends do not come into contact with the metal plate. Gaskets of this kind also involve a separate expensive machining step to form the annular rings, thus increasing production costs.

Another known gasket only incorporates sealing beads as the sealing element on the perimeter of the gasket aperture. Sealing beads alone are unsatisfactory because significant compression is necessary to cause the beads to bear against the flanges of the cylinder head and cylinder block to create an adequate seal.

Therefore, there exists a need for a gasket having a minimum number of parts that can be manufactured cost-efficiently without sacrificing sealing effectiveness.

SUMMARY OF THE INVENTION

The present invention is directed to a metal gasket having a sealing element positioned around apertures in the gasket, such as a combustion opening, whereby the sealing element is formed by an extrusion and ironing process in combination with a folding operation.

A first embodiment of the metallic gasket of the present invention includes a plate, preferably constructed of stainless steel for durability, having a body portion and a flange portion which encircles the perimeter of an aperture formed in the gasket. The body portion has a substantially uniform thickness. The flange portion also has a substantially uniform thickness, however, the thickness of the flange portion is less than the thickness of the body portion. The thickness of the flange portion is achieved by extruding and ironing the flange portion of the metal plate to the desired thickness without requiring specialized tooling for precise machining operations.

After extruding, the flange portion is folded forward onto the body portion in facing relationship, creating a stopper seal as a primary seal at an edge of the gasket aperture. Because of the reduced thickness of the flange portions, the seal operating thickness is advantageously only slightly larger than the plate body thickness. An optional embossment spaced radially and outwardly from the stopper seal could also be provided to serve as a secondary sealing element, thereby increasing the durability of the combustion seal area.

In a second embodiment, the metallic gasket of the present invention includes a plate having a body portion and an offset portion which encircles the perimeter of an aperture formed in the gasket. The offset portion includes a tapered thickness portion. A tapered punch cooperates with a die having inclined walls to iron the offset portion, including the tapered portion, to create a flange portion having a thickness less than the thickness of the body portion. As in the first embodiment, the flange portion is then folded forward onto the body portion in facing relationship, creating a stopper seal as a primary seal at an edge of the gasket aperture.

The gasket of the present invention has the advantage of easily controlling seal operating thickness by controlling the flange thickness without having to perform time consuming tooling set-up to achieve precise tolerances, thereby reducing production costs. By simply varying the flange thickness, the seal operating thickness can be cost-effectively varied for a wide range of gasket operating conditions.

BRIEF DESCRIPTION OF THE DRAWINGS

The features and inventive aspects of the present invention will become more apparent upon reading the following detailed description, claims, and drawings, of which the following is a brief description:

FIG. 5 illustrates a sectional view of a lower portion of a punch press in accordance with a third embodiment of the invention.

FIGS. 6A and 6B are sectional views taken along lines 6A—6A and 6B—6B respectively of FIG. 5 illustrating different thicknesses of a flange portion in accordance with the third embodiment of the invention.

DETAILED DESCRIPTION OF PREFERRED EMBODIMENTS

Figure 1:
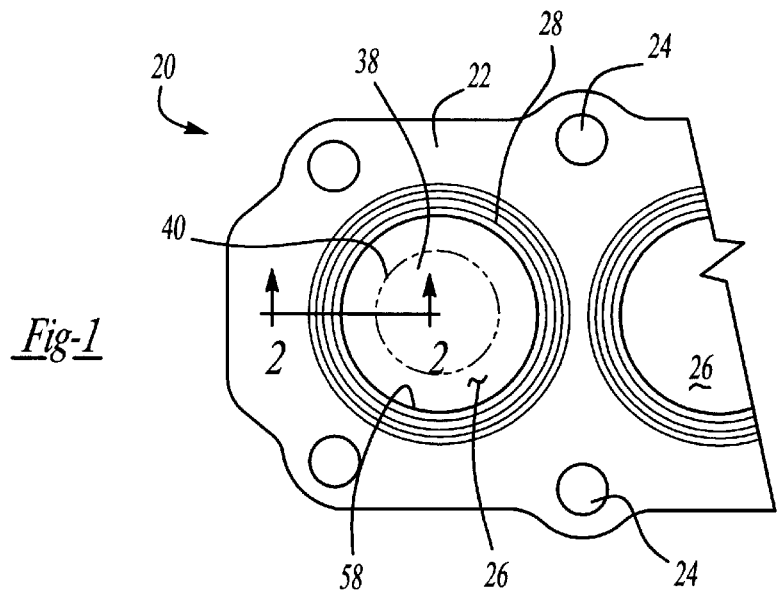
FIG. 1 is a partial plan view showing an embodiment of a gasket according to the present invention.

FIG. 1 shows a gasket 20 constructed from a single thin plate 22 of a tempered material such as full hard SAE 301 stainless steel or springsteel. Gasket 20 has a plurality of bolt holes 24 and apertures 26 adapted to mate with combustion chambers (not shown) of an engine. Each aperture 26 is provided with a stopper seal 28 to serve as a primary combustion seal around the perimeter of each aperture 26 to provide adequate primary sealing so as to prevent gases from escaping the combustion chambers.

Figure 2:
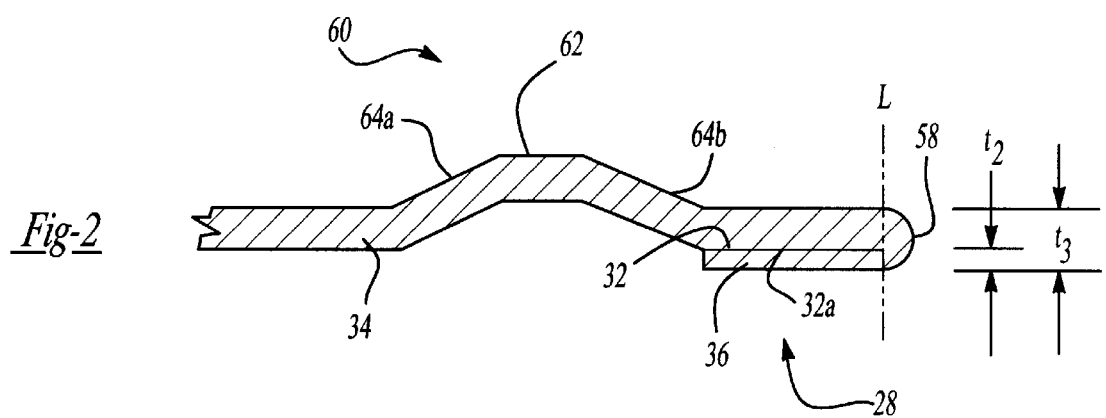
FIG. 2 is a sectional view taken along line 2—2 of FIG. 1 showing the gasket.
Figure 3A:
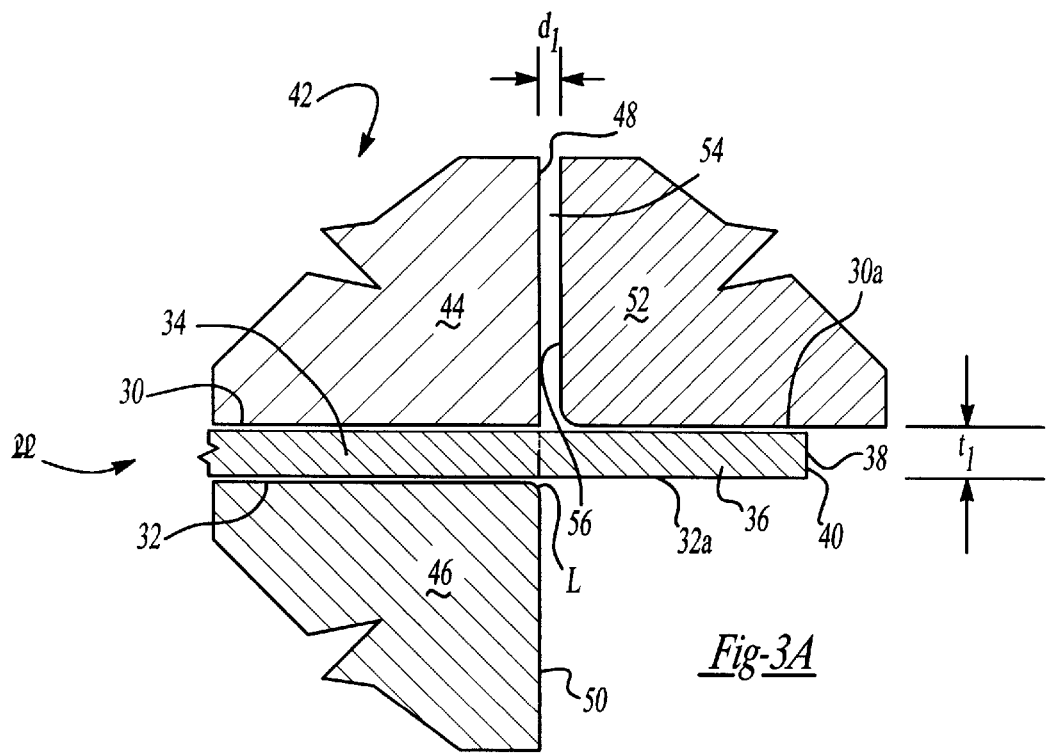
FIGS. 3a and 3b are sectional views of a die apparatus and extrusion punch press in an extrusion process for making a first embodiment of the present invention.
Figure 3B:
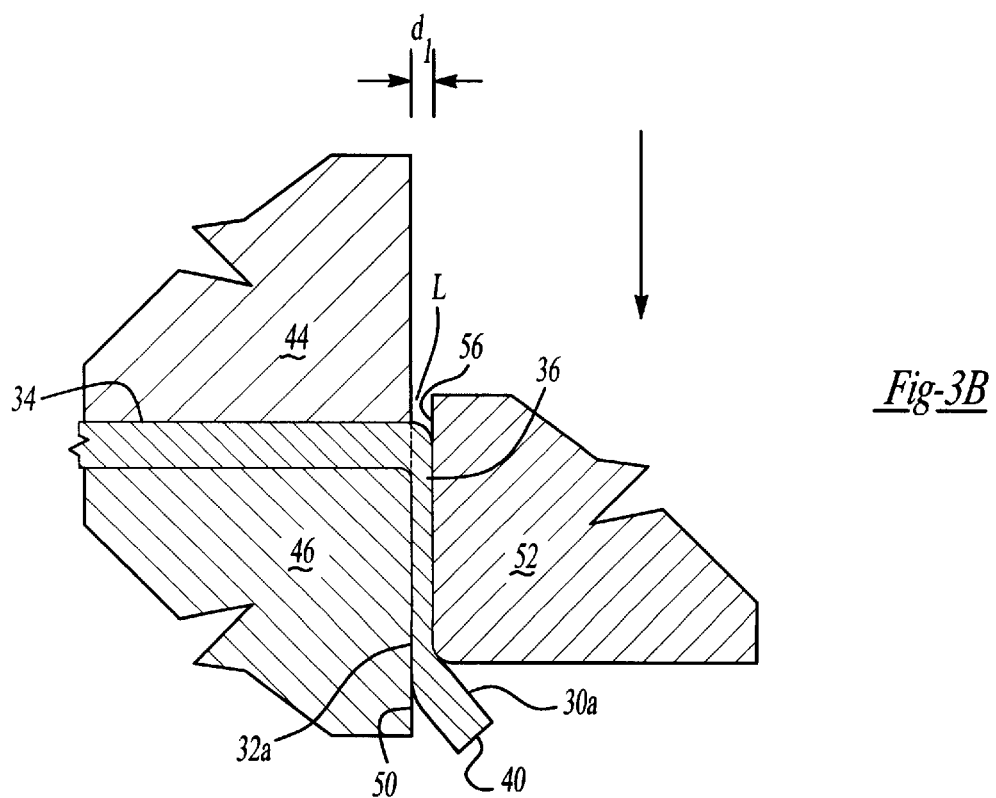

FIGS. 3a and 3b depict a first process for forming stopper seal 28. The completed seal is shown in FIG. 2. Referring to FIG. 3a, plate 22 has a top surface 30 and a bottom surface 32 which define a thickness t1. Preferably, plate 22 has a thickness t1 in the range of 0.15–0.30 mm with thickness t1 being substantially uniform throughout the length of plate 22.

Plate 22 includes a body portion 34 and a flange portion 36 that encircles a perimeter of a preblanked small aperture 38, shown in phantom in FIG. 1. Small aperture 38 is defined by a flange end 40. A fold line L, spaced inwardly from flange end 40, serves to define body portion 34 and flange portion 36 of plate 22.

A die assembly 42, having an upper die 44 and a lower die 46, is provided for holding plate 22 in position during the stopper seal forming process. Body portion 34 of plate 22 is positioned within die assembly 42 so as to be sandwiched between upper die 44 and lower die 46. Fold line L is lined up with leading edges 48 and 50 of upper and lower dies 44 and 46, respectively, thereby spacing small aperture 38 away from die assembly 42. An extrusion punch press 52 is positioned above flange portion 36 and small aperture 38 of plate 22 and adjacent to upper die 44. Extrusion punch press 52 is spaced from upper die 44 a distance d1, thereby forming a gap 54 between die assembly 42 and extrusion punch press 52. Further, extrusion punch press 52 has an outer diameter that corresponds to the predetermined diameter of aperture 24.

Referring to FIG. 3b, in operation extrusion punch press 52 is moved in a downward direction to extend through small aperture 38 and contact top surface 30a of flange portion 32. The downward force of extrusion punch press 52 forces flange portion 36 to bend at fold line L such that bottom surface 32a comes into contact with leading edge 50. As extrusion punch press 52 continues downward, flange portion 36 becomes disposed within gap 54 between leading edge 50 and an outside surface 56 of extrusion punch press 52 such that flange portion 36 is extruded and ironed. Due to gap 54, flange portion 36 becomes lengthened and thinned to a thickness t2 which is equal to distance d1. Preferably thickness t2 is in the range of approximately 30–60% of the thickness of body portion 34 to provide a satisfactory operating thickness for stopper seal 28. A preferred thickness t2 is approximately 0.06–0.15 mm such that flange portion 36 is about half the thickness of body portion 34. In a preferred embodiment, extrusion punch press 52 only needs to be actuated once to achieve the reduced thickness t2 of flange portion 36, thereby providing a quick and easy cost-effective method to achieve reduced thickness t2. However, it is understood that this step may need to be repeated depending on the nature of the plate material and the original thickness t1 of plate 22.

Once flange portion 36 has been extruded and ironed to desired thickness t2, flange portion 36 is then trimmed to remove any disruptions caused by the extrusion process. Preferably the length of reduced thickness flange portion 36 is approximately 1.5–2.5 mm such that gasket is somewhat light weight to reduce costs associated with shipping and handling, but yet has enough length to produce a stopper seal with satisfactory primary sealing performance. It is understood however, that the length of reduced thickness flange portion 36 will be dependent upon the nature of the plate material and the thickness t2 of flange portion 36.

After trimming, a folding operation occurs. Flange portion 36 is folded forward toward bottom surface 32 about remnant fold line L until a bottom surface 32b of flange portion 36 abuts bottom surface 32 of body portion 34 in facing relation to form primary stopper seal 28, as shown in FIG. 2. This creates a seal thickness t3 which is slightly greater than plate 22 thickness t1. An edge 58 of primary stopper seal 28 defines the remnant of fold line L and the inner periphery for aperture 24. While bottom surface 32b of flange portion 36 is shown abutting bottom surface 32 of body portion 34, it is understood that flange portion 36 may be folded so as to abut top surface 30 in a facing relationship.

Figure 4A:
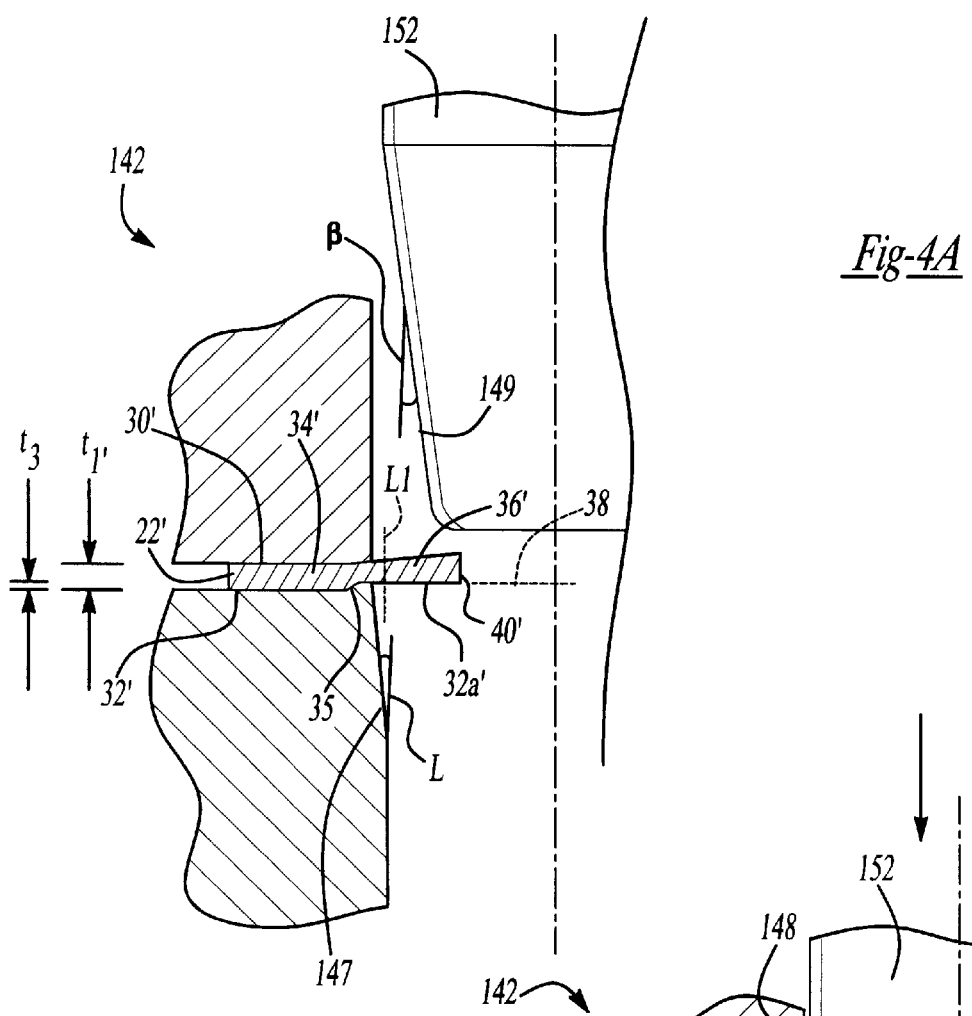
FIGS. 4a and 4b are sectional views of a die apparatus and extrusion punch press in an extrusion process for making a second embodiment gasket of the present invention.
Figure 4B:
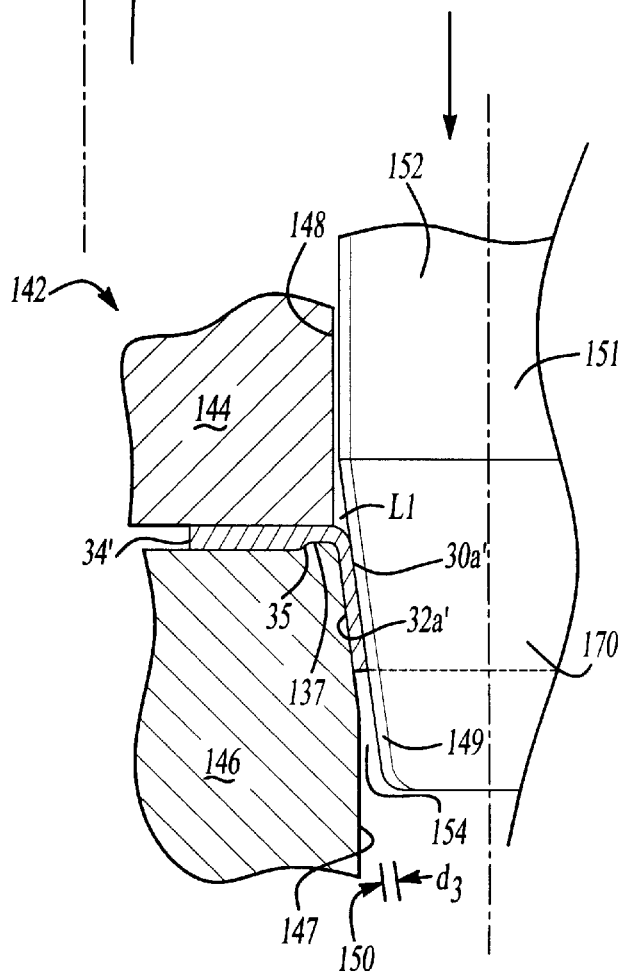

FIGS. 4a and 4b depict a second process for forming stopper seal 28 of FIG. 2. Referring to FIG. 4a, plate 22' has a top surface 30' and a bottom surface 32' which define a thickness t1'. Preferably, plate 22' has a thickness t1' in the range of 0.15–0.30 mm with thickness t1' being substantially uniform throughout the length of plate 22'.

Plate 22' includes a body portion 34' and a flange portion 36' that encircles a perimeter of the preblanked small aperture 38 shown in phantom in FIG. 1. Small aperture 38 is defined by a flange end 40'. When preblanked aperture 38 is formed, bottom surface 32a' of flange portion 36' becomes slightly offset a distance t3 from lower surface 32' of the body portion 34'. Preferably, offset distance t3 is in the range of 0.07–0.10 mm. In addition, upper surface 30a' of flange portion 36' is sloped slightly upwardly away from upper surface 30' of body portion 34' of plate 22', thereby forming a tapered thickness portion at flange end 40' adjacent aperture 38. A fold line L1, spaced inwardly from flange end 40', serves to define body portion 34' and flange portion 36' of plate 22'. Fold line L1 may also be spaced outwardly of offset 35. Spacing fold line LI outwardly of offset 35 has been determined to further reduce the incidence of cracks during the stopper seal forming process.

As seen in FIG. 4b, a die assembly 142, having an upper die 144 and a lower die 146, is provided for holding plate 22' in position during the stopper seal forming process. Body portion 34' of plate 22' is positioned within die assembly 142 so as to be sandwiched between upper die 144 and lower die 146. Fold line L1 is lined up with leading edges 148 and 150 of upper and lower dies 144 and 146, respectively, thereby spacing small aperture 38 away from die assembly 142. As seen in FIG. 4b, leading edge 150 of lower die 146 may include a lip 137 sized to accommodate offset 35 when fold line Li is spaced outwardly of offset 35. Lower die 146 also includes walls 147 that are inclined inwardly from vertical at an angle α (see FIG. 4a).

An extrusion punch press 152 is positioned above flange portion 36' and small aperture 38 of plate 22' and adjacent to upper die 144. When fully extended, extrusion punch press 152 is spaced from lower die 146 a distance d3, thereby forming a gap 154 between die assembly 142 and extrusion punch press 152. Further, extrusion punch press 152 includes a tapered surface 149 that is contoured at an anole β (see FIG. 4a) that substantially matches angle α and the shape of inclined walls 147 of lower die 146, though angle β is preferably slightly larger than angle α. The inclined walls 147 and the tapered surface 149 may be formed at any convenient angle. But angles α and β are preferably shallow angles which allow the tonnage of the punch press 152 to be minimized while maximizing the force exerted against flange portion 36'. Moreover, more than one punch press 152 may be used with lower die 146 if the pressing operation requires more than one step to reduce cracking of flange portion 36'.

In operation, tapered extrusion punch press 152 is moved in a downward direction to extend through small aperture 38 and contact tapered top surface 30a' of flange portion 136. The downward force of extrusion punch press 152 forces flange portion 36' to bend at fold line L1 such that bottom surface 32a' comes into contact with leading edge 150 and inclined wall 147. As tapered extrusion punch press 152 continues downward, flange portion 36' becomes disposed within gap 154 between leading edge 150 and an outside surface 156 of tapered extrusion punch press 152 such that flange portion 36' is extruded and ironed. Due to gap 154, flange portion 36' becomes lengthened and thinned to a thickness t2' which is approximately equal to distance d3. However, because angle β is preferably slightly larger than angle α, the flange portion 36' is thinned to a tapered thickness such that thickness t2' is not a constant thickness along the length of flange portion 36'. Thickness t2' may be made a constant thickness, though, by setting angle β to be approximately equal to angle α. Preferably thickness t2' is in the range of approximately 30–60% of the thickness of body portion 34' to provide a satisfactory operating thickness for stopper seal 28. As noted above, a preferred thickness t2' is approximately 0.06–0.15 mm such that flange portion 36' is about half the thickness of body portion 34'. Preferably, tapered extrusion punch press 152 only needs to be actuated once to achieve the reduced thickness t2' of flange portion 36', thereby providing a quick and easy cost-effective method to achieve reduced thickness t2'. However, as noted above, it is understood that this step may need to be repeated with more than one punch press 152 having different angles β, depending on the nature of the plate material and the original thickness t1' of plate 122. The best results have been obtained by using a first press having an angle β of 10–13°, and then using a second press having an angle β of between 7.1° and 8.0°. In both operations, wall 147 is preferably inclined at an angle of about 7° from vertical. But it is understood than any combination of shallow angles may be used to achieve the results of the invention.

Upper portion 151 of extrusion punch press 152 also has an outer diameter that corresponds to the predetermined diameter of aperture 26. But, as best seen in FIG. 5, the lower portion 170 of punch press 152 need not be circular in cross section. Instead, it is preferable that the cross-section of lower portion 170 be slightly squared off to form corners 172 that locate generally along four imaginary lines drawn from the center C of press 152 to each of the centers C' of the bolt holes 24. As seen with reference to FIGS. 6A and 6B, the variation in outer diameter of the lower portion 170 of punch press 152 results in a variation in thickness of the extruded flange portion 36'. In particular, the thickness t4 of flange portion 36' in FIG. 6A is greater than the corresponding thickness t5 of flange portion 36' in FIG. 6B. As a result, when flange portion 36' is folded adjacent lower surface 32', a greater combined thickness of stopper plate 22 is left in the area generally between the bolt holes 24. It has been found that by leaving an increased combined thickness in the areas between the bolt holes 24, head lift-off is reduced during engine operation. Preferably, thickness t4 is in the range of 0.10 to 0.15 mm thick, while thickness t5 is in the range of 0.05 to 0.10 mm thick. Most preferably, thickness t4 is 0.12 mm, and thickness t5 is 0.07 mm.

For ease of reference, the following description relating to formation of the stopper seal shown in FIG. 2 refers only to the reference numbers in FIGS. 3a and 3b, but it should be understood to apply equally to the embodiment of FIGS. 4a and 4b.

Once flange portion 36 has been extruded and ironed to desired thickness t2, flange portion 36 is then trimmed to remove any disruptions caused by the extrusion process. Preferably the length of reduced thickness flange portion 36 is approximately 1.5–2.5 mm such that the gasket is somewhat light weight to reduce costs associated with shipping and handling, but yet has enough length to produce a stopper seal with satisfactory primary sealing performance. It is understood however, that the length of reduced thickness flange portion 36 will be dependent upon the nature of the plate material and the thickness t2 of flange portion 36.

After trimming, a folding operation occurs. In the first embodiment, flange portion 36 is folded forward toward bottom surface 32 about remnant fold line L until a bottom surface 32b of flange portion 36 abuts bottom surface 32 of body portion 34 in facing relation to form primary stopper seal 28, as shown in FIG. 2. This creates a seal thickness t3 which is slightly greater than plate 22 thickness t1. An edge 58 of primary stopper seal 28 defines the remnant of fold line L and the inner periphery for aperture 24. While bottom surface 32b of flange portion 36 is shown abutting bottom surface 32 of body portion 34, it is understood that flange portion 36 may be folded so as to abut top surface 30 in a facing relationship.

After stopper seal 28 is formed as the primary combustion seal, an optional embossment 60 or bead may be formed from body portion 34 of plate 22 by any standard beading operation. FIG. 2 shows embossment 60 having an apex 62 defined between angled legs 64a and 64b such that apex 62 extends in an upward direction from remainder of body portion 34. As illustrated, leg 64b terminates immediately adjacent to stopper seal 28 such that embossment 60 is positioned radially and outwardly from stopper seal 28 to act as a secondary combustion seal. The addition of embossment 60 is preferred to ensure increased sealing and durability of the combustion seal area around aperture 24, thereby prolonging the wear life of gasket 2Q. It is understood that embossment 60 may be alternatively oriented such that apex 62 extends in a downward direction.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:
1. A gasket, comprising:
   a metallic plate having a body portion, a flange portion and an aperture;
   said flange portion having a top and a bottom surface, said bottom surface including an offset portion, said flange having a predetermined thickness that is less than a predetermined thickness of said body portion; and
   a stopper seal formed by an end of said flange portion being folded over about a fold line and onto a surface of said body portion such that one of said top and bottom surfaces of said flange portion is abutting and in facing relation to said surface of said body portion, an edge of said stopper seal defining a remnant of said fold line and the inner periphery for said aperture such that said stopper seal acts as a primary seal to prevent undesirable escaping of gases and fluids from said aperture.

2. The gasket of claim 1, further including at least one embossment formed from said body portion of said plate and positioned radially and outwardly of said stopper seal so as to serve as a secondary seal for said aperture.

3. The gasket of claim 2, wherein said embossment has an apex defined by legs said apex being oriented such that said embossment extends in an upward direction relative to the remainder of said body portion.

4. The gasket of claim 1, wherein said predetermined thickness of said flange portion is approximately half of said predetermined thickness of said body portion.

5. The gasket of claim 4, wherein said predetermined thickness is not constant along the length of said flange portion.

6. The gasket of claim 4, wherein said predetermined thickness is constant along the length of said flange portion.

7. The gasket of claim 1, wherein said flange portion is folded over about said fold line such that said bottom surface of said flange portion abuts in facing relation a bottom surface of said body portion.

8. The gasket of claim 1, wherein said fold line is located in said flange portion inward of said offset.

9. The gasket of claim 1, wherein said flange portion varies in thickness about the circumference of said aperture.

10. A method of forming a single layer gasket with an integral stopper seal, comprising the steps of:

providing a plate having a substantially uniform first thickness, said plate including a body portion and a flange portion, said flange portion encircling a perimeter of an aperture wherein said aperture has a first diameter, said flange portion being slightly offset from said body portion to form an offset portion and including an upper surface that is sloped slightly upwardly away from an upper surface of said body portion to form a tapered thickness portion;

positioning said plate in a die assembly such that said aperture is spaced away from said die assembly;

positioning a tapered extrusion punch press adjacent to said assembly and above said flange portion and said aperture of said plate, said tapered extrusion punch press being spaced a distance away from said inclined die assembly so as to provide a gap therebetween;

operating said tapered extrusion punch press in a downward direction to extend through said aperture and contact said flange portion, thereby bending said flange portion about a fold line and disposing said flange portion within said gap such that said flange portion is extruded and ironed to a predetermined uniform seal thickness, said seal thickness being less than said first thickness of said plate; and folding said flange portion about said fold line onto a surface of said body portion such that said flange portion is abutting and in facing relation to said surface of said body portion so as to form a stopper seal, an edge of said stopper seal defining a remnant of said fold line and an inner periphery of said aperture, wherein said extrusion and ironing step enlarges said aperture so as to have a second diameter that is greater than said first diameter.

11. The method of claim 10, wherein said die assembly further includes a lip along a leading edge thereof sized to be received into said offset portion.

12. The method of claim 10, wherein said offset portion is offset from said body portion a distance of between 0.07–0.10 mm.

13. The method of claim 12, wherein said die assembly further includes an inclined surface.

14. The method of claim 13, wherein said inclined surface is contoured to substantially match the shape of said tapered extrusion punch press.

15. The method of claim 14, wherein said inclined surface and said tapered extrusion punch press define an angle of about 7–13° from vertical.

16. The method of claim 10, further including trimming said flange portion to a predetermined length prior to said folding step so as remove any disruptions in said flange portion after said flange portion has been extruded and ironed.

17. The method of claim 16, wherein said predetermined length of said extruded flange portion of said plate is in the range of approximately 1.5–2.5 mm.

18. The method of claim 17, wherein said folding step includes folding said flange portion over about said fold line such that a bottom surface of said flange portion is abutting and in facing relation to a bottom surface of said body portion.

19. The method of claim 18, further including the step of forming at least one embossment from said body portion of said plate, said embossment positioned radially and outwardly of said stopper seal to serve as a secondary seal for said aperture.

20. The method of claim 19, wherein said embossment is formed with an apex that is oriented such that said embossment extends in an upward direction relative to the remainder of said body portion.

21. The method of claim 16, wherein the cross-section of a lower portion of said tapered extrusion punch press is slightly squared off.

* * * * *